United States Patent [19]

Story

[11] Patent Number: 4,622,722
[45] Date of Patent: Nov. 18, 1986

[54] WIRE CLAMPING APPARATUS

[76] Inventor: Dennie R. Story, 2929 Limaburg Rd., Hebron, Ky. 41048

[21] Appl. No.: 705,004

[22] Filed: Feb. 25, 1985

[51] Int. Cl.$^4$ .............................................. F16G 11/00
[52] U.S. Cl. ................................ 24/115 R; 24/135 R; 403/43; 403/215
[58] Field of Search ............ 24/115 R, 116 R, 30.5 R, 24/128, 135 R, 135 A, 135 K, 135 L, 762; 403/43, 46, 156, 215, 251, 257; 256/DIG. 3; 339/14 L, 263 R

[56] References Cited

U.S. PATENT DOCUMENTS

| | | |
|---|---|---|
| 259,168 | 6/1882 | Kennedy . |
| 457,858 | 8/1891 | Treen . |
| 624,449 | 5/1899 | Brunk . |
| 689,980 | 12/1901 | Matthews . |
| 706,393 | 8/1902 | Darling . |
| 785,511 | 3/1905 | Miller . |
| 1,268,981 | 6/1918 | Lapp . |
| 1,297,039 | 3/1919 | Torkelson . |
| 1,552,522 | 9/1925 | Vincent . |
| 1,555,351 | 9/1925 | Boynton ................................ 24/71.2 |
| 1,652,191 | 12/1927 | Withers ........................ 339/14 L X |
| 2,422,039 | 6/1947 | Pritchard . |
| 2,538,141 | 1/1951 | Wyatt . |
| 2,636,534 | 4/1953 | Herbick ......................... 24/116 R X |
| 3,923,406 | 12/1975 | Fritz ................................. 403/215 X |

Primary Examiner—William E. Lyddane
Assistant Examiner—James R. Brittain
Attorney, Agent, or Firm—Wood, Herron & Evans

[57] ABSTRACT

A wire gripping apparatus for use with a tensioning device to stretch wire in preparation for mounting to fence posts. An elongated rod has a slotted wire locating plate mounted at its forward end, a support plate extending along the rod and a clamping member movable axially along the rod from its rearward end toward the rear end of the support plate. The support plate has a rearward edge provided with a slot which faces the clamping member. The wire is placed within the slot in the wire locating plate, bent or crimped into the slot in the support plate, and the clamping member is axially moved along the rod and into contact with the rearward edge of the support plate to capture the wire. The wire clamping apparatus is connected by an eyelet at the rear end of the rod to a suitable tensioning device, such as a come-along or winch for stretching the wire. Slot openings in the locating and support plates are radially spaced at 90° with respect to the rod to prevent release of the wire from the slot in the locating plate.

9 Claims, 2 Drawing Figures

WIRE CLAMPING APPARATUS

BACKGROUND OF THE INVENTION

This invention relates to devices useful in constructing wire fences, and, more particularly, to an apparatus for gripping wire so that it may be stretched for mounting to fence posts.

In the construction of wire fences the wire must be tautly stretched and fastened to the fence posts while in stretched condition to avoid snags. In order to apply sufficient stretching force to the wire with a winch or the like, it is necessary to securely grip the wire so that it does not slip when the stretching force is applied. In many prior art designs, a wire clamping device is provided either as an integral part of, or is adapted for connection to, some means stretching the wire. Comealongs, winches or simple lever arrangements such as shown in U.S. Pat. No. 689,980 to Matthews have all been used.

One man fence erecting with known wire stretching devices is a difficult proposition at best. For example, in the Matthews patent a wire clamping apparatus is releasably hooked to a lever which in turn is secured to a fence post or other fixed support directly or by an anchor chain. The wire must first be clamped, and the clamp hooked to the lever. The lever is then pulled to stretch the wire.

Devices such as the Matthews apparatus require constant manual tension on the lever. Given the fact that it generally requires two hands to hold and hammer a fastener into place over the stretched wire, the resulting contortions required by one person trying to accomplish this basically two-man job require excessive time and are frustrating.

Moreover, even if a constant or lockable tension device, such as a winch, is used, another problem with many wire stretchers is that the wire clamping devices themselves are too easily released from the wire upon any relaxation of tension. Once the wire is released it may curl up as a result of the natural curling tendencies, and in any event the wire must be relocated and re-gripped. These occurrences require increased time in the fencing operation and are very frustrating.

Accordingly, and with past devices it has been difficult for one man to constantly apply enough stretching tension on the wire to maintain the clamping device in clamped condition during various required wire manipulations. It is also difficult, as noted above, for one man at the same time to position the wire and attach it to the fence posts, all while maintaining enough tension to keep the wire gripped in the clamp, and stretched appropriately.

SUMMARY OF THE INVENTION

It is therefore a principal object of this invention to provide an improved fence wire clamp for use in gripping wire for stretching.

A further objective of the invention is to provide an improved wire clamp which securely clamps the wire irrespective of the application of wire tensioning force.

A further objective of the invention is to provide an improved fence wire clamp which facilitates the installation of wire on fence posts by one man.

These objectives are accomplished by a wire gripping apparatus according to this invention and including an elongated rod, a wire locating plate at a forward end of the rod, a support plate extending along and attached to the rod, and a clamping plate movable axially along a threaded portion of the rod opposite the locating plate to clamp a wire between itself and the support plate. Slots are formed in the rear edge of the support plate adjacent the clamping member for receiving a portion of the wire to be clamped, and a wire locating slot is provided in the forward locating plate for securing a forward end of the apparatus to the wire and maintaining it in a generally parallel relationship with the wire.

In order to clamp a wire, the wire is first inserted within the locating slot in the forward locating plate and extended along the length of the support plate. The wire is then bent about 90° at the rear end of the support plate and inserted within the slot formed there. Preferably, if barbed wire is used, the wire is positioned so that one of the barbs is placed just beneath the slot in the support plate. The clamping plate is then screwed axially along the rod and into engagement with the rear edge of the support plate to clamp the wire therebetween in preparation for stretching. An eyelet or other mounting element is welded or threaded onto the rearward end of the rod for attachment of the gripping apparatus to a stretching device such as a come along or a winch.

In order to accommodate wires of different gauge, the support plate is formed with a number of slots, each sized to receive a wire of a specific gauge. Preferably, the clamping plate has about the same transverse dimension as the support plate so that it engages the entire rear edge of the support plate so as to clamp wire placed in any of the slots formed therein.

Preferably, the slot in the support plate has an opening at the rear edge of the support plate spaced 90° radially from the position of the opening of the slot in the edge of the forward locating plate. This tends to maintain contact between the locating plate and the wire, even when the apparatus is not under tension. And in any event, the clamping action of the clamping plate against the rear of the support plate insures that the wire will not be released even where wire tension is relaxed.

The preferred wire gripping clamp apparatus is adapted for use with standard winches, come alongs or virtually any other hand or power operated device for stretching the wire. Once the wire is clamped in place, the clamping apparatus is secured to such a device for stretching of the wire. The operator is thereafter free to use both hands to fasten the wire to a fence post.

The clamping apparatus of this invention does not require the wire to be placed in tension to securely clamp it in place, rather the wire is positively held by the pressure of the clamping plate against the support plate. Thus, the wire is positively gripped at all times and is not released from the clamping apparatus, even if all stretching force is released and the apparatus dropped on the ground. Once the wire is stretched, the operator has the use of both hands to secure the wire to the fence.

DESCRIPTION OF THE DRAWINGS

The structure, operation and advantages of this invention will become further apparent upon consideration of the following detailed description of a preferred embodiment, taken in conjunction with the accompanying drawings, wherein.

DETAILED DESCRIPTION OF THE INVENTION

Figure 1:
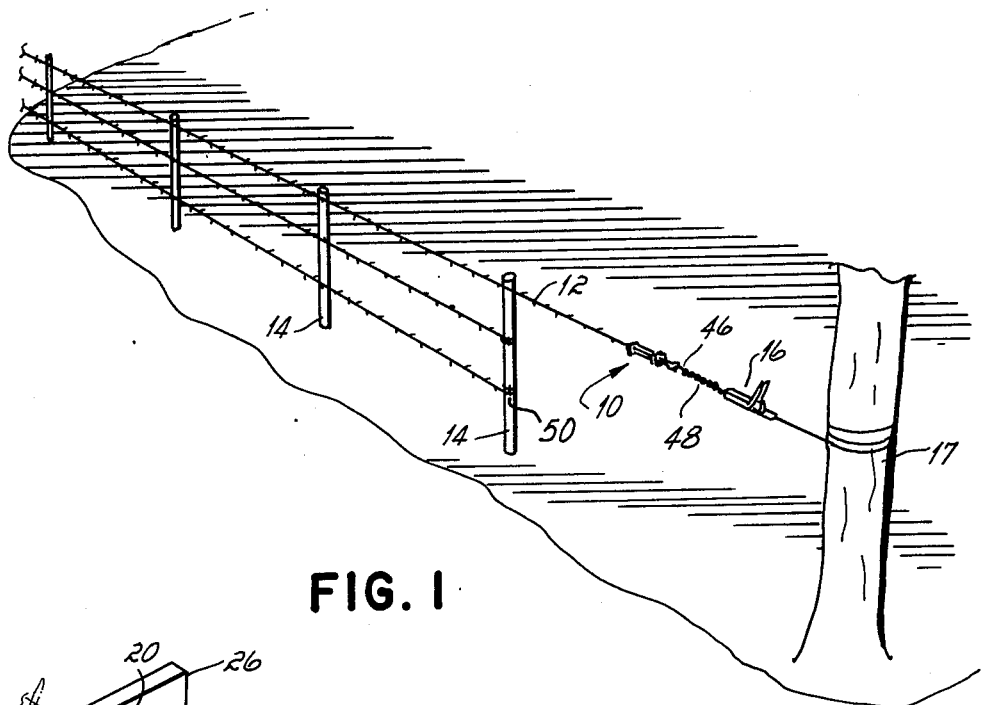
FIG. 1 is a schematic perspective view of the clamping apparatus of this invention in use with a stretching device for mounting of the wire to fence posts.

Referring now to the drawings, the wire clamping apparatus 10 is shown in an application for mounting barbed wire 12 to wooden fence posts 14. The clamping apparatus 10 is adapted to securely clamp the barbed wire 12, and then connect to a stretching device such as a standard come-along 16 secured to a an immovable object such as tree 17 or a truck or tractor so that the barbed wire 12 can be stretched taut for mounting to fence posts 14. Although a commercially available come-along 16 is illustrated in the drawings, it is only one example of a stretching device with which the clamping apparatus 10 may be utilized. The clamping apparatus 10 is also adapted for use with hand operated levers, a winch or other commonly used power tools (not shown), although a constant lockable device is preferred.

The clamping apparatus 10 includes an elongated rod 18 having a forward end 20 and a rearward end 22. Preferably, the rod 18 is threaded from its rearward end 22 toward the forward end 20 along a portion 24 of its length, although it is contemplated that the rod 18 could be threaded along its entire length if desired. A front wire locating plate 26 is securely mounted to the forward end 20 of rod 18 transversely and perpendicularly to the longitudinal axis of the rod 18. An L-shaped, wire locating slot 28 extends from an outer edge of plate 26 inwardly toward the center.

A clamping plate 30 is rotatably secured to the threaded portion 24 of rod 18 by means of a nut 34 welded to the plate. The nut 34 engages the threaded portion 24 of rod 18 and is rotatable with the clamping plate 32 so that the clamping plate can move axially therealong.

A rectangular-shaped support plate 36, formed of preferably rigid material, is welded to the rod 18 between the front plate 26 and clamping plate 30. The rod 18 is approximately centered on the support plate 36 and threaded portion 24 of rod 18 extends at least up to the support plate 36. In a presently preferred embodiment of this invention, the support plate 36 includes a rear edge 38 formed with a slot 40 on one side of the rod 18 and a slot 42 on the other side of rod 18. The slots 40, 42 are of different widths for receiving wire of different gauges, such as 12 gauge or 15 gauge wire, respectively.

Figure 2:
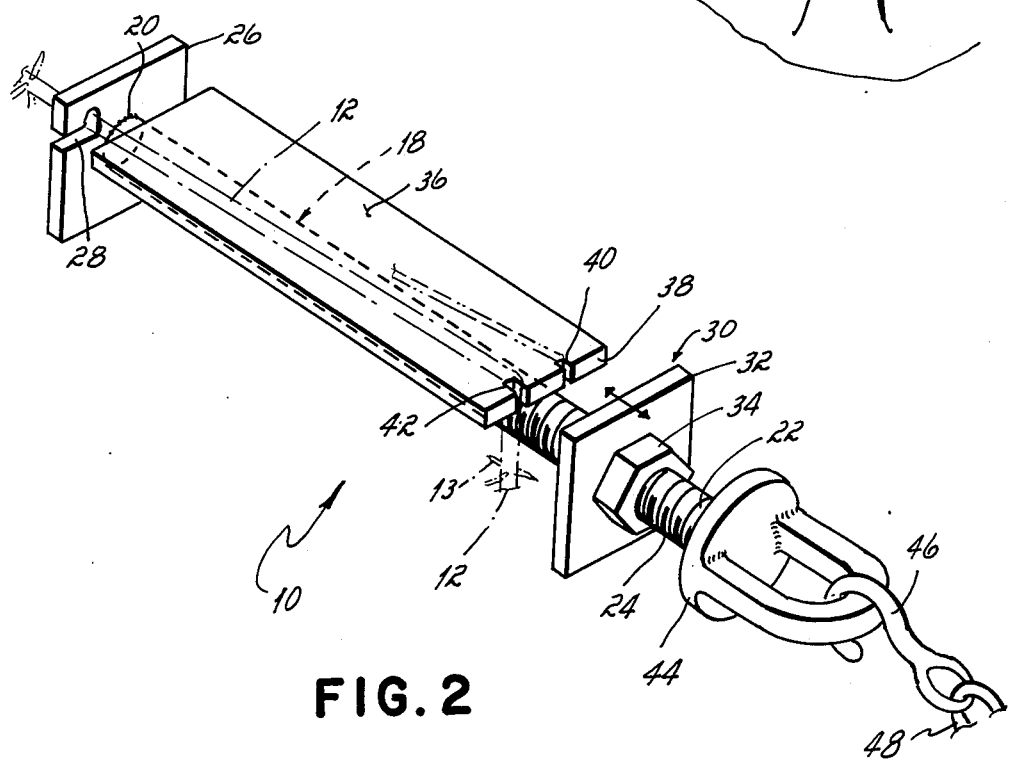
FIG. 2 is an enlarged perspective view of the clamping apparatus herein.

As noted in FIG. 2, the slots 40, 42 in rear edge 38 of plate 36 open in the edge at a first radial position with respect to the rod. Slot 28 in locating plate 26 opens in an edge of that plate at a second radial position with respect to the rod. These two radial positions are spaced apart about 90°, and this orientation tends to maintain any wire in slot 28, even when tension is released.

Also, when stretching force is applied to the apparatus, it may tend to pivot on the wire about slots 40, 42. The 90° spatial orientation of these slots to slot 28 acts to prevent release of wire from slot 28 and thus tends to maintain apparatus 10 generally parallel to the wire. This insures that the stretching force is exerted on the bent or crimped portion of the wire, at about 90° or more to the overall tensioned wire direction. This reduces any tendency of the clamp to slide the wire when tension is applied.

The barbed wire 12 is clamped within the clamping apparatus 10 in the following manner. The wire 12 is first inserted within the slot 28 of front plate 26 at the forward end 20 of rod 18. The wire 12 extends along the length of support plate 36 toward its rear edge 38. At the rear edge 38 of support plate 36, the wire 12 is bent at approximately a 90° angle and inserted within one of the slots 40, 42 depending on the gauge of the wire 12. If barbed wire 12 is utilized, it is preferable to position the wire 12 so that a barb 13 is located immediately beneath the slot 40 or 42 to aid in preventing movement of the clamp 10 along the wire 12. The clamping plate 30 is then rotated to move axially along the threaded portion 24 of rod 18 and into engagement with the rear edge 38 of support plate 36. This engagement clamps the wire 12 between plate 36 and clamp plate 30. The transverse dimension of the clamping plate 32 is about the same as that of the rear edge 38 of support plate 36 so that it closes off both slots 40, 42.

An eyelet 44 is threaded or welded onto the rearward end 22 of rod 18 for mounting the clamping apparatus 10 to a tensioning device. The eyelet 44 is adapted to receive a hook 46 mounted at the end of a chain or cable 48 which is connected to the come-along 16 for stretching of the wire 12. Although an eyelet 44 is illustrated in the drawings, it is contemplated that any other mounting element could be connected to the rearward end 22 of rod 18 for mounting of the clamping apparatus 10 to a tensioning device.

With the wire 12 securely clamped within clamping apparatus 10, it is stretched and held by operation of the come-along 16 in a known manner. The operator is then free to use both hands in securing the stretched wire 12 to the fence posts 14 with fasteners 50.

While a preferred embodiment of the invention has been described with respect to gripping barbed wire, it will be appreciated that the invention could be used in the gripping of smooth wire as well. In this regard, a crimp or bend formed in the smooth wire, and beneath the slot as viewed in FIG. 2, could serve to aid in maintaining the wire against slippage.

Accordingly, the invention provides wire gripping apparatus positively holding wire therein and preventing wire release even when tension is removed from the wire, and during wire manipulation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but only by the appended claims.

I claim:
1. Apparatus for clamping wire comprising:
an elongated rod having a forward end and a rearward end;
a wire locating means mounted to said forward end of said rod for holding wire therein;
a clamping means movably mounted to said rod;
a support plate non-rotationally fixed to said rod between said wire locating means and said clamping means, said support plate having a rearward end and wire receiving means disposed in the rearward end of the support plate;

said support plate defining a wire path from a forward end of said rod to the rearward end of said support plate; and said clamping means being axially movable along said rod toward said rearward end of said support plate for capturing and holding wire against the rearward end of said support plate within said receiving means and against movement with respect to said apparatus.

2. Apparatus as in claim 1 wherein said wire receiving means comprises a wire-receiving slot located in a rearward edge of said support plate.

3. The apparatus of claim 2 in which said clamping means comprises a clamping plate, and wherein said rod is threaded between said support plate and a rearward end of said rod, said clamping plate being axially movable along said threaded portion of said rod toward said support plate for capturing and holding a wire within said wire receiving slot.

4. The apparatus of claim 1 in which said wire locating means is a plate, said plate having a slot extending inwardly from an edge thereof for receiving said wire.

5. The apparatus of claim 4 further including a wire receiving slot disposed in a rearward edge of the support plate and opening at a disposition spaced 90° radially, with respecting to the rod, from the opening of the slot in the edge of the locating plate.

6. The apparatus of claim 1 further including an eyelet mounted to said rearward end of said rod.

7. The apparatus of claim 1 wherein said wire receiving means comprises a plurality of spaced, wire receiving slots in the rearward end of said support plate, each of said wire receiving slots receiving a wire of different gauge respectively.

8. A method of clamping and holding wire comprising the steps of:

providing a clamping apparatus including a rod having an eyelet mounted at one end, a wire locating member formed with a slot mounted to the other end of said rod, a clamping member axially movable along said rod, a support plate nonrotationally fixed to said rod between said wire locating plate and said clamping member, said support plate defining a wire path from a forward end of said rod to the rearward end of said support plate and having a rear edge facing said clamping member and having at least one slot in said rear edge;

inserting said wire within said slot of said wire locating member;

extending the wire in said wire path along said support plate;

bending said wire and inserting said wire within said slot at the rear edge of said support plate; and moving said clamping member into engagement with said rear edge of said support plate and thereby capturing said wire in said slot in the rear edge of the support plate.

9. A method as in claim 8 wherein said wire is barbed wire and said method includes the step of bending said wire between barbs thereon and inserting said wire in said slot at the rear edge of said support plate with a barb adjacent said slot proximate said support plate and clamping member, and on another side thereof from said wire locating member.

* * * * *